Oct. 17, 1967  E. BAHNIUK ETAL  3,347,041
HYDRAULIC STEERING SYSTEM

Filed Oct. 23, 1965  3 Sheets-Sheet 1

INVENTORS
EUGENE BAHNIUK,
& JACK L. THOMPSON
BY McNENNY, FARRINGTON, PEARNE & GORDON
ATTORNEYS

Oct. 17, 1967  E. BAHNIUK ETAL  3,347,041
HYDRAULIC STEERING SYSTEM
Filed Oct. 23, 1965
3 Sheets-Sheet 2

INVENTORS
EUGENE BAHNIUK
& JACK L. THOMPSON
BY
McNENNY, FARRINGTON, PEARNE & GORDON
ATTORNEYS

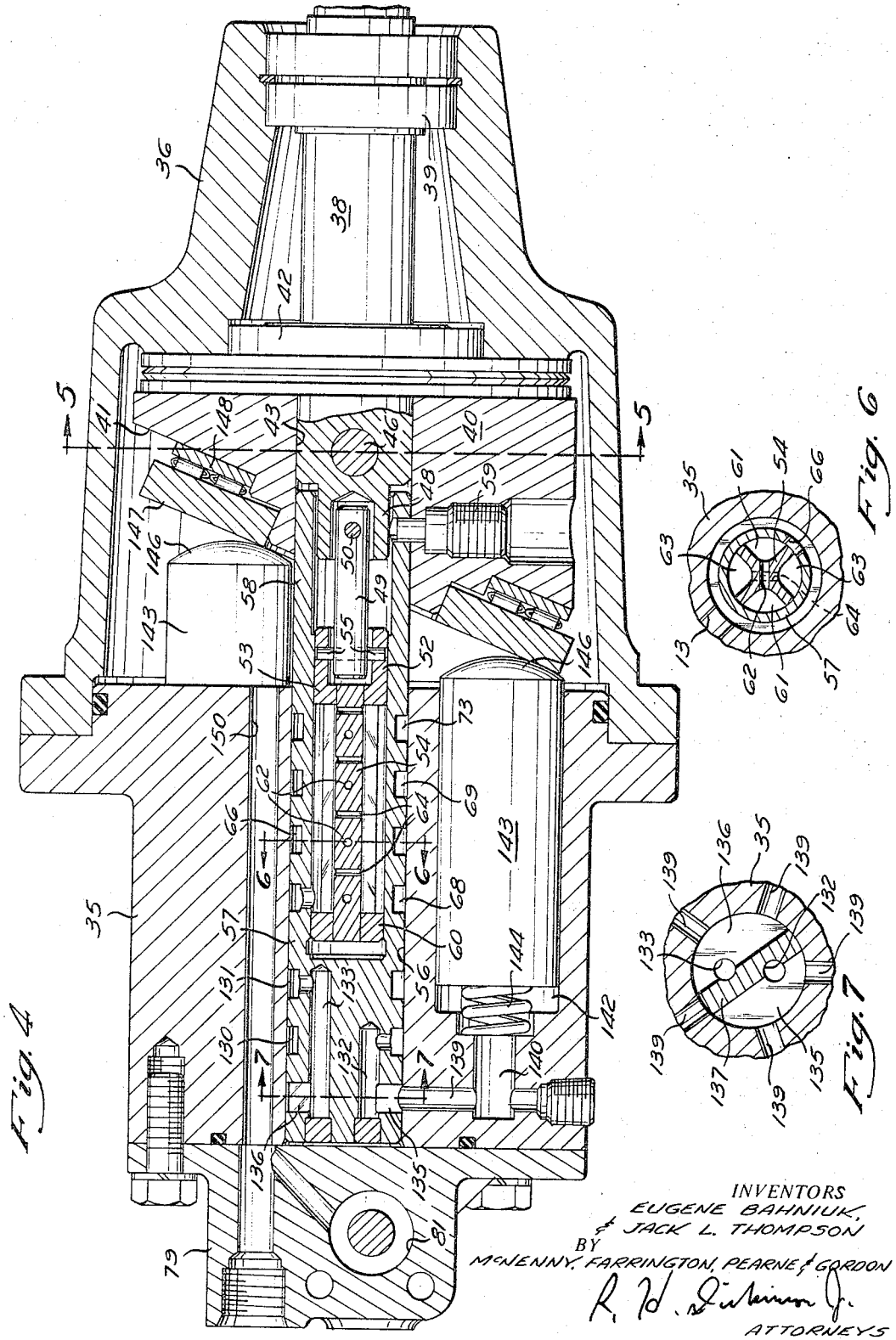

United States Patent Office 3,347,041
Patented Oct. 17, 1967

3,347,041
HYDRAULIC STEERING SYSTEM
Eugene Bahniuk, Gates Mills, and Jack L. Thompson, South Euclid, Ohio, assignors to The Weatherhead Company, Cleveland, Ohio, a corporation of Ohio
Filed Oct. 23, 1965, Ser. No. 503,808
18 Claims. (Cl. 60—52)

ABSTRACT OF THE DISCLOSURE

A hydrostatic steering system including a metering valve, a condition selector valve and an axial feedback motor for controlling fluid flow between the pump and the actuator motor. These units are interconnected so that fluid flows from the pump to the metering valve and from the metering valve to the condition selector valve which is fluid actuated to direct the fluid flow next to the feedback motor and from the feedback motor back through the condition selector valve to the actuator motor and from the actuator motor back through the condition selector valve to the reservoir. In the absence of fluid from the pump, the feedback motor is driven by a mechanical connection to pump fluid through the condition selector valve which is actuated in a different mode of operation to operate the actuator motor.

---

This invention relates generally to hydraulic control systems and more particularly to a hydraulic servo-type control system particularly adapted to provide a complete steering system for wheeled vehicles.

Hydraulic steering control systems for vehicles may generally be considered as of two types. In one type commonly found on automobiles a mechanical linkage is maintained between the steering wheel and the steerable vehicle wheels and the servo system is arranged so that it is responsive to either torque applied to or displacement of the steering wheel and is used to control the fluid flow to and from a fluid motor which then assists the effort applied manually through the steering linkage.

The other type is a complete power system in which there is no mechanical linkage and the steering wheel is used to control a steering valve which directs fluid to a reversible fluid motor which actuates the wheels directly. This latter system has many advantages, particularly on heavy vehicles because it eliminates the requirement for the mechanical linkage. However, such systems have presented several problems which have reduced their usage in the past. One problem is that a feedback arrangement must be provided to give a feel to the wheel so that the operator knows from his operation of the steering wheel that the vehicle wheels have moved to the position desired. However, efforts to provide a feedback by means of a motor applying a feedback torque or follow-up for the operator's steering wheel have met with a problem because leakage in such systems has resulted in wander of the vehicle system so that correctional movements must be continuously applied to the steering wheel by the operator. Still another problem with such systems has been the need to require some emergency system whereby the steering wheel can be used to move the vehicle wheels in the event of a failure in the hydraulic system or source of supply of fluid pressure.

One arrangement which solves this has been the one disclosed in the co-pending application of Eugene Bahniuk, Tadeusz Budzich and Jack L. Thompson, Ser. No. 492,819 filed Oct. 4, 1965, now Patent No. 3,320,745, issued May 23, 1967 and assigned to the assignee of the present application. In this system, the steering wheel is used to actuate one member of a metering valve connected to a source of fluid pressure, with the metering valve having another movable member which is operated by an axial piston fluid motor to provide the feedback. The fluid flows from the metering valve to a condition selector valve and from the condition selector valve to the steering motor, with the exhaust from the steering motor passing through the feedback motor and back to drain. If there is a loss of fluid pressure from the pump, a lost motion connection is provided to allow the steering wheel to rotate the feedback motor directly so that it acts as a pump instead of a motor and pumps fluid from the reservoir to the condition selector valve which then operates in a different mode of operation to direct the fluid to the steering actuator motor to move the wheels.

It is therefore a principal object of this invention to provide an improved and novel power steering system of the type generally disclosed in said co-pending application. More particularly, in the system of the present invention the feedback motor is utilized in a "metering in" operation rather than the "metering out" operation of said co-pending application. Thus, the feedback motor is provided with fluid directly from the metering valve at high pressure and the fluid then flows from the feedback motor to the condition selector valve and then to the steering actuator motor, from which it flows back to the condition selector valve and to drain. Such a system, because of the operation of the feedback motor at the higher pressure, gives improved stability to the system and better feel to the operator, particularly when the steering actuator cylinder comes to the end of its travel, because then the feedback motor is attempting to pump fluid into a dead-headed line and thereby provides resistance against further rotation of the steering wheel.

Another feature of this invention is that when there is a loss of fluid pressure from the pump, the fluid flow under manual steering conditions is in a closed cycle between the feedback motor acting as a pump, the condition selector valve and the steering actuator motor, so that it is not necessary to supply fluid from the reservoir thereby insuring greater safety in the event of loss of oil from the reservoir or the reservoir lines. However, check valves may be used to allow fluid make-up supply from the reservoir through drain lines if desired.

Another feature of this invention allows the system to have priority on the use of the fluid supplied from the pump when the metering valve is of the open center type. In such case, there is no pressure drop across the metering valve and the drain lines in the metering valve may be connected to a downstream load or unit to do work at any pressure up to the system maximum without affecting the operation of the steering system. In such case, actuation of the metering valve under steering conditions will allow the steering valve to have priority over the downstream line to direct fluid to the feedback motor and the rest of the system at full supply pressure and volume. In the event that steering actuation does not require the full pressure and volume of the system, the remaining portion may still be utilized by the downstream units which receive the exhaust or drain from the steering system.

Additional features and advantages of this invention will readily be apparent to those skilled in the art upon a more complete understanding of the preferred embodiment of the invention which is described in the following detailed description and shown in the accompanying drawings in which:

FIGURE 4 is a longitudinal sectional view of the steering unit incorporating a metering valve, feedback motor and shuttle valve shown schematically in FIGURES 1 through 3;

FIGURE 6 is a fragmentary cross-sectional view taken on line 6—6 of FIGURE 4 showing the arrangement of the metering valve; and FIGURE 7 is a fragmentary cross-sectional view taken on line 7—7 of FIGURE 4 showing the pintle valve for the feedback motor.

Figure 1:
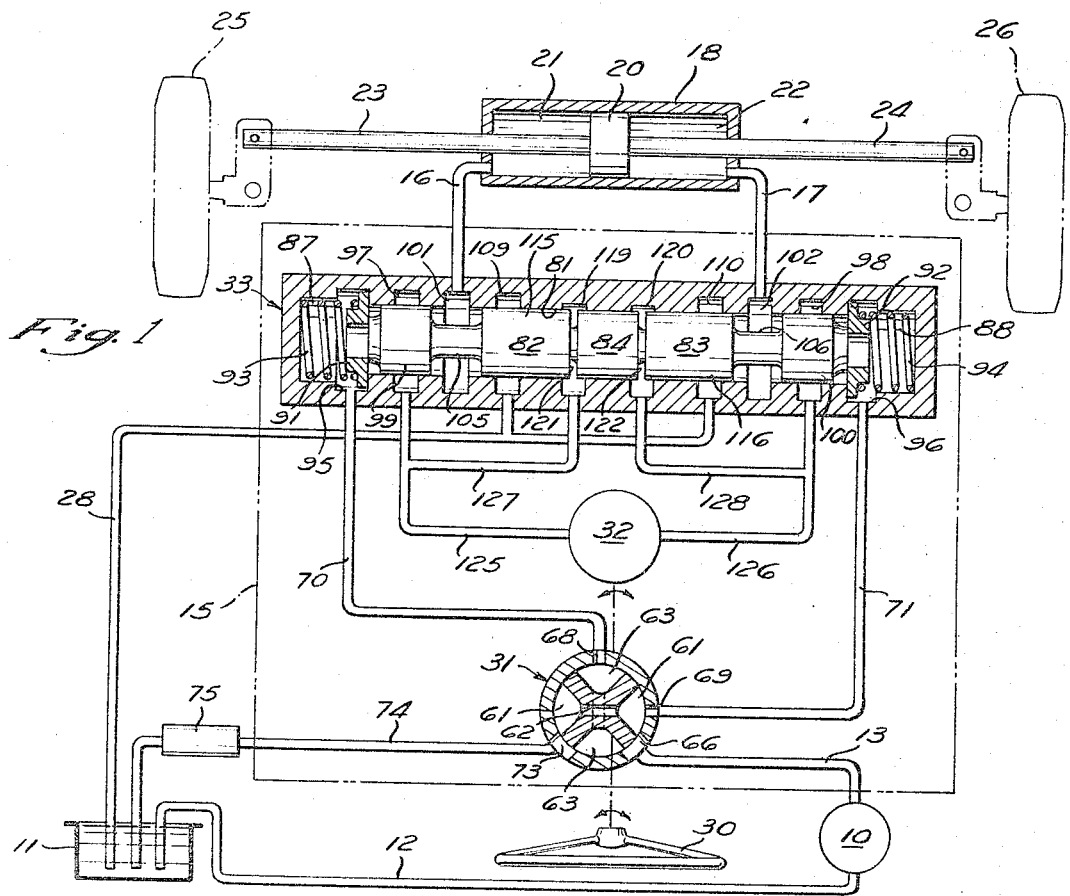
FIGURE 1 is a schematic showing of the hydraulic steering system according to the preferred embodiment of the invention under neutral steering conditions.

Referring now to the figures in greater detail, the general arrangement of the power steering system of the preferred embodiment of this invention is shown partially schematically in FIGURE 1. A hydraulic pump 10 has its inlet side connected to a fluid reservoir 11 through a line 12 and has its outlet side connected through a high pressure discharge line 13 to the steering unit which consists of the portion indicated within the box at 15. The portion of the system within the box 15 is shown in greater detail in the FIGURES 4 through 7.

The steering unit 15 is connected by a pair of lines 16 and 17 to a steering motor cylinder 18 having a sliding piston 20 therein. The piston 20 is positioned to divide the interior of the cylinder into a pair of fluid motor chambers 21 and 22 and to each side of the piston 20 are connected a pair of piston rods 23 and 24 which are connected to the steerable vehicle wheels indicated at 25 and 26. It will be understood that this hydraulic motor assembly may be of any conventional type used for moving one or more steerable wheels or other steering device in reversible directions for steering the vehicle. A drain line 28 leads from the steering unit 15 back to the reservoir 11 to provide for return circulation of the hydraulic fluid.

The operator control of the steering system is by a means of a conventional steering wheel 30, but as shown in the schematic arrangement, the steering wheel is connected directly to one element of a rotary metering valve indicated generally at 31, the other element of which is rotated by the feedback motor 32, and the selective connections of fluid to the hydraulic motor 18 from the feedback motor are made by means of the shuttle valve indicated generally at 33. The metering valve 31 is shown as being of the rotary type, and the steering wheel shifts the one portion of the valve and the feedback motor the other to return the metering valve to a neutral position indicating that the steerable wheels have moved through the requisite change in position determined by the movement of the steering wheel 30. In addition, as explained in greater detail hereinafter, a lost motion mechanical connection is provided directly between the steering wheel 30 and the feedback motor 32 so that in the event of failure of the hydraulic pump 10, the steering wheel can operate the feedback motor as a pump and thereby manually pump fluid into one or the other of the fluid motor chambers 21 and 22 to allow manual steering of the vehicle.

Figure 5:
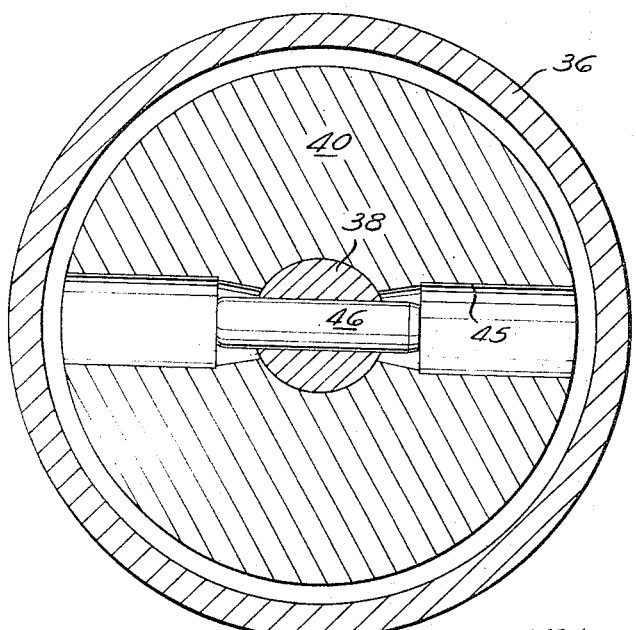
FIGURE 5 is a cross-sectional view taken on line 5—5 of FIGURE 4 showing the lost motion connection.

The steering unit shown in FIGURES 4 through 7 includes the metering valve 31 and feedback motor 32 within a body 35 enclosed at one end by a suitable cover 36. The steering shaft 38, secured to steering wheel 30, extends axially into the cover 36 where it is journaled by a bearing 39. A cam plate 40 having an inclined cam surface 41 is journaled within the cover 6 by suitable means such as the bearing assembly indicated at 42. Cam plate 40 has an axial bore 43 extending therethrough to receive the end of the steering shaft 38. The lost motion connection between the steering shaft 38 and the cam plate 40 of the feedback motor is shown in FIGURE 5 and includes a transverse bore 45 in the cam plate 40. The steering shaft 38 carries a crosspin 46 having a diameter less than that determined by the transverse bore 45 to allow limited relative movement between the steering shaft and the cam plate before the pin 46 contacts the sides of the transverse bore 45.

At its inner end, the steering shaft 38 has a tubular extension 48 to receive one end of a connecting rod 49 which is non-rotatably connected to extension 48 by the crosspin 50. At its other end, the rod 49 fits within a tubular extension 52 on the end 53 of the metering valve spool 54 to which it is non-rotatably connected by a crosspin 55. The crosspins in rod 49 act to form the universal joint between the steering shaft and the metering valve spool to correct for any possible misalignment. The metering valve spool 54 fits within the metering valve spool sleeve 57 which in turn is rotatably journaled in the axial bore 56 of the body 35. At its outer end, the metering sleeve 57 has a tubular extension 58 which fits within the cam plate bore 43 to which it is non-rotatably connected by a locking screw 59. Thus, it will be seen that the metering valve spool 54 rotates with the steering shaft 38, while the metering valve sleeve 57 rotates with the cam plate 40 and the angular displacement between these two valve members is limited by the lost motion connection provided by the transverse bore 45 and pin 46.

The metering valve is preferably of the open center type so that when no steering power is required there will be free flow through the metering valve from the pump and substantially no pressure build-up will take place. The operation of the metering valve is seen from FIGURE 6 as well as the schematic showings of the valve in different operating positions in FIGURES 1 through 3. As shown, the valve spool 54 is generally cruciform in shape to have four longitudinally extending passages spaced apart by four vanes extending uniformly between the ends 53 and 60 of the valve spool which make sealing contact with the metering valve sleeve 57. The opposite pairs of longitudinal passages are connected at all times, so that the one pair 61 is connected by means of internal sleeve passages indicated at 62 while the other pair of passages 63 is likewise interconnected by means of separate transverse passages 64.

The metering valve sleeve is provided with four ports which as shown in FIGURE 4 are identified by their collecting grooves which in turn are connected to the necessary passages (not shown in FIGURE 4) to conduct the fluid to and from the remaining portions of the steering unit. The inlet line 13 from the pump 10 opens into port 66, which when the metering valve spool is in the neutral position is connected to both of the sets of passages 61 and 63 so as to allow free flow between both of these passages. Spaced 90° away from port 66 is a drain port 73 which is connected to a line 74 which may lead to a downstream load 75 after which the fluid will return to the reservoir 11. Likewise, one control port 68 is connected to one pair of passages 63 and by a line 70 to operate under pressure to move the steering vehicle in one direction, whereas the other control port 69 is connected to the other pair of passages 61 and to another line 71 so that fluid pressure may act to move the vehicle wheels in the opposite direction.

It will be seen that when the metering valve spool is in the neutral position, fluid pressure will be allowed to flow to both of the sets of passages 61 and 63 and therefore from both of these passages to the drain port 73. Thus, the fluid pressure will be equalized in the two lines 70 and 71 and since the drain port 73 is open, there will be substantially no pressure drop in the metering valve and all of the fluid from the pump 10 will go to the downstream load 75. When the metering valve is rotated in either direction, the action of the vanes on the valve spool are such as to disconnect the supply port 66 from one of the pair of passages 61 and 63 and disconnect the drain port 73 from the other of the spool passages to disconnect the supply port from the drain port and thereby cause a build-up of fluid pressure in the metering valve. Thus, the fluid will be diverted from the downstream load 75 into the steering unit to give the steering unit priority over the downstream load.

The fluid under pressure from either of the control ports 68 and 69 is directed through the lines 70 and 71 to the shuttle valve indicated generally at 33. As shown in FIGURE 4, the shuttle valve is mounted in a housing 79 bolted on the opposite end of body 35 from that of the cover 36. The operation of the shuttle valve is most clearly seen from the showing of that valve in FIGURES 1 through 3. The valve includes a longitudinal bore 81 within which are mounted three slidable valve spools 82, 83 and 84. The two spools 82 and 83 are identical, but turned end for end and separated by the middle spool 84 (see FIGURE 3).

The lines 70 and 71 lead to respective chambers 87 and 88 at each end of the bore 81. Within these chambers are apertured plungers 91 and 92 biased inwardly by springs 93 and 94. The plungers 91 and 92 are arranged with radial flanges to work within grooved portions 95 and 96 arranged to limit inward movement of the plungers under the action of the adjacent biasing spring and to limit outward movement of the associated one of the spools 82 and 83. Thus, fluid admitted through one of the lines 70 or 71, depending upon the direction of rotation of the steering wheel 30, will allow high pressure fluid to enter the associated chamber, and passing through the apertured plunger this fluid will act on the end of the adjacent valve spool to shift the assembly of the three spools 82, 83 and 84 along the bore 81 until the opposite apertured plunger is moved to a stop position against the outer side of the associated one of the grooves 95 and 96.

A spaced distance inwardly of the grooves 95 and 96 are annular grooves 97 and 98, which in the neutral position as shown in FIGURE 1 are blocked off by lands 99 and 100 on the left and right spools 82 and 83, respectively. Inwardly of the grooves 97 and 98 are another pair of left and right grooves 101 and 102 which are connected by lines 16 and 17 to the left and right chambers 21 and 22, respectively of the steering cylinder 18. Opposite each of the grooves 101 and 102 are a pair of spool grooves 105 and 106 on the left and right valve spools 82 and 83, respectively.

Inwardly of the grooves 101 and 102 are a pair of annular drain grooves 109 and 110 which are connected by the drain line 28 to the reservoir 11. These drain grooves 109 and 110, in the neutral position, are blocked off by the wide lands 115 and 116 on the valve spools 82 and 83, respectively. Inwardly of the drain grooves are another pair of grooves 119 and 120 positioned opposite chambers 121 and 122 formed between the middle spool 84 and the left and right spools 82 and 83, respectively. The chambers 121 and 122 are formed by the small projections on each side of the middle spool 84 to allow fluid pressure entering the grooves 119 and 120 to act between the spools to force them apart as will be described in greater detail hereinafter. The shuttle valve structure is completed by the lines 125 and 126 which lead from the grooves 97 and 98, respectively to opposite sides of the feedback motor 32. Additional lines 127 and 128 connect the grooves 119 and 120 back to the associated one of lines 125 and 126.

The feedback motor 32 is connected only to the lines 125 and 126, one of these acting as an inlet and the other the outlet depending upon the direction of rotation of the steering wheel and operation of the shuttle valve. The construction of the feedback motor is shown in FIGURE 4 and is in the form of an axial piston unit operable either as a motor or a pump. The lines 125 and 126 are connected by suitable passages to annular grooves 130 and 131 on the metering valve sleeve 57. This sleeve also serves as a pintle type distributing valve for the feedback motor, and accordingly passages 132 and 133 lead axially from the grooves 130 and 131 to open into a pair of valve chambers 135 and 136 separated by the vane 137 (see FIGURE 7). Since the metering valve sleeve is connected directly to the cam plate, this arrangement insures positive timing of the valving action of the vane 137 with the cam plate 140. The chambers 135 and 136 alternately move into alignment with the radial passages 139 which connect with axial passages 140. These latter passages open into the axially extending cylinders 142, of which there are five in the preferred embodiment. Pistons 143 are slidably mounted in cylinders 142 and biased outwardly by springs 144 so that their outer surrounded ends 146 make engagement with an annular reaction plate 147. The reaction plate 147 is journaled by means of a thrust bearing 148 against the cam surface 41 on cam plate 40. A drain passage 150 is provided to connect the space around the cam plate 40 back of one of the drain grooves 109 and 110 of the shuttle valve.

It will be seen therefore that the feedback motor unit, depending upon the pressurization of the chambers 135 and 136 will either act as a motor unit tending to rotate the cam plate or, when rotated by the cam plate, act as a pump when the unit is used for manual steering. Thus, an input signal applied to the steering wheel 30 is transmitted to the metering valve spool 54 which directs the flow of fluid through the shuttle valve and through the feedback motor before going to the steering cylinder. Because the fluid flow through the feedback motor will cause a follow-up rotation of the cam plate 40, and because of the low leakage characteristics of the axial piston unit, this follow-up action will be sufficiently fast that even rapid rotation of the steering wheel 30 will not cause the lost motion between the pin 46 and transverse bore 45 to be taken up. Of course, additional feel can be provided in the system by having the steering wheel biased to the center of the lost motion connection by suitable spring means. This would insure that as the steering wheel is turned, a centering biasing force would be provided by such springs which would vary with the follow-up motion of the cam plate to give the operator a certain amount of steering feel.

Figure 2:
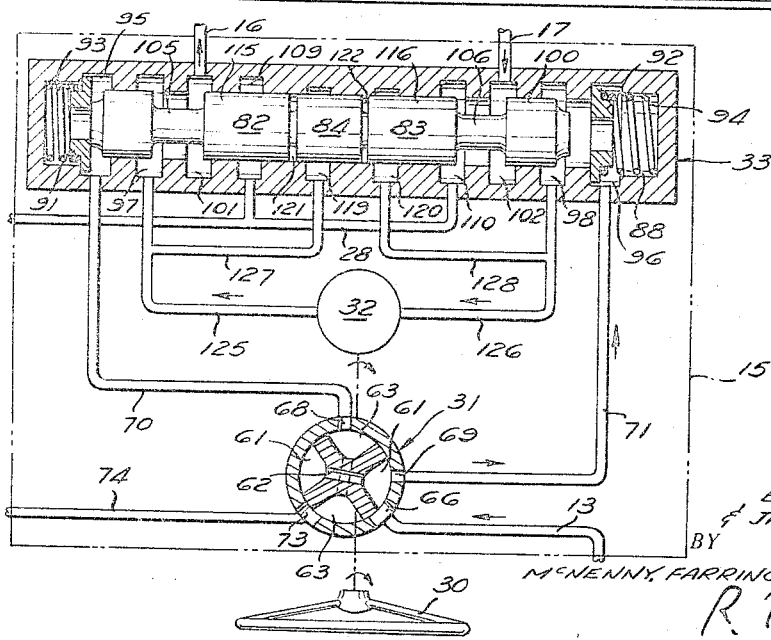
FIGURE 2 is a schematic partial view of the steering unit shown in FIGURE 1 under powered turn conditions.
Figure 3:
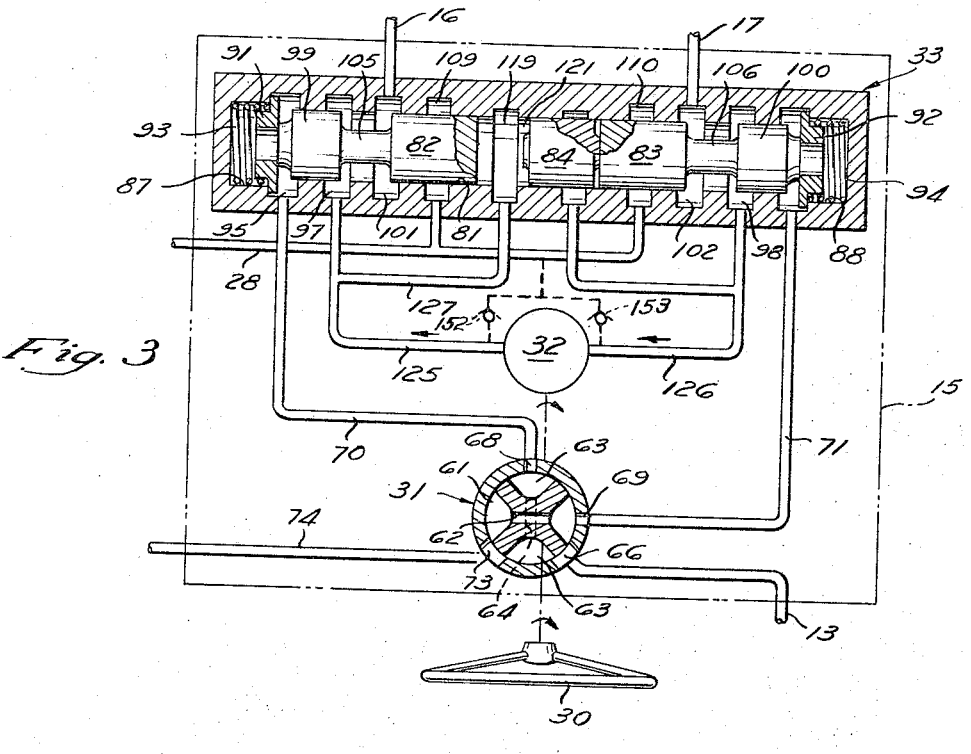
FIGURE 3 is a view similar to FIGURE 2 but showing the system as arranged for manual steering operation in the absence of fluid supply from the pump.

The operation of the system is best seen from the different conditions shown in FIGURES 1, 2 and 3. The foregoing description was applied to the unit in the neutral position as shown in FIGURE 1 in which no power is applied. FIGURE 2 shows the operation of the system under power when a right turn is made. As the wheel is rotated to the right, the metering valve spool rotates as indicated in FIGURE 2 so that the supply port 66 is connected to the right port 69, at the same time that the left port 68 is connected by the drain port 73 to line 74. In this condition the fluid flows from the right port 69 to line 71 into the chamber 88 where it acts on the end of the right spool 83. This shifts the three spools 82, 83 and 84 as a unit to the left compressing the left biasing spring 93, the excess fluid in this chamber draining through the line 70.

When the three valve spools are in this position, the fluid then coming in through line 71 is allowed to flow directly to the groove 98, no longer blocked off by land 100, and from there through the line 126 to the feedback motor 32. The line 128 and its groove 120 are blocked off by the land 116. As the feedback motor 32 rotates to follow-up the steering wheel 30, the fluid flows out through the line 125 to the groove 97. Any flow through line 127 is blocked since the middle spool 84 blocks off the groove 119. Since the left spool 82 has been shifted to the left, its reduced portion or annular groove 105 then connects the grooves 97 and 101 to let the fluid flow between them and into the line 16 where it flows to the motor chamber 21. This causes the piston 20 to move toward the right and actuate the vehicle wheels in that direction.

To allow this movement, the fluid in chamber 22 must be drained and thus leaves through the line 17 to enter the groove 102. Since the right hand spool 83 is shifted toward the left, its reduced portion of annular groove 106 now allows communication between the grooves 102 and 110 so that the draining fluid from line 17 passes into groove 102 to groove 110 and thus through the drain line 28 back to the reservoir. This action will continue to take place until the follow-up action of the cam plate has rotated the metering valve sleeve to a position where no pressure is applied to the line 71, after which the centering springs allow the valve spools to return to the neutral position. Of course, the shuttle valve operates in the opposite direction on a left hand turn.

In the event that the pump 10 should fail or for any reason no fluid pressure is supplied to the port 66, rotation of the steering wheel 30 will cause the lost motion to be taken up and will rotate the cam plate 40 directly. This will now cause the feedback motor 32 to operate as a pump. As shown in FIGURE 3, rotation of the steering wheel 30 in the same direction will cause the feedback motor 32, now acting as a pump, to pump fluid from the line 126 into the line 125. Under these conditions, since no pressure has been supplied to either of the lines 70 or 71 to shift the valve spools, they initially will be in the neutral position with the lands 99 and 100 blocking off the grooves 97 and 98 to which the lines 125 and 126 are connected. Therefore, in this condition the fluid pressure will flow into the line 127 and there into groove 119 where it acts on the chamber 121. This causes the left hand spool 82 to be driven to the full distance to the left against the force of its biasing spring 93, while the middle spool and the right hand spool 83 are driven to the right against the biasing force of spring 94. The reduced portion 105 of spool 82 now allows communication between the grooves 97 and 101 while reduced portion 106 of spool 83 simultaneously allows communication between grooves 102 and 98. In this condition there is a clear circuit to allow the high pressure fluid in the line 125 to now flow into the cylinder line 16 to move the piston 20 to the right as in the power steering condition. The drain fluid from line 17, however, now flows into the groove 102 and from there into groove 98 where it flows back by the line 126 to the feedback motor. Thus, when no fluid is supplied from the pump 10, the feedback motor, now acting as a pump, in combination with the shuttle valve selecting the proper operation, allows the feedback motor to operate as a pump to transfer fluid directly between the two chambers of the steering motor in a closed system without allowing any fluid to flow to drain so that no fluid is lost in this condition. Thus, even if the line 13 were ruptured, the operation of the unit as a closed system under manual control would allow continued operation for a period of time under manual steering. If it is considered necessary to allow for replenishment of fluid in the closed system, this may be accomplished by optionally providing check valves 152 and 153 to supply fluid from drain line 28 to one of the lines 125 and 126, respectively, depending upon which line is acting as the inlet to the feedback motor 32. Since the check valves prevent escape of pressurized fluid to line 28, they do not otherwise affect operation of the system.

A particular advantage of this unit is that the arrangement of the shuttle valve and axial piston feedback motor which is a low leakage unit, insures a minimum of leakage throughout the system even at high pump pressure. Therefore, under these conditions there will be a minimum of drift or wander which might be noticeable to the operator.

Although the preferred embodiment of this invention has been shown and described in detail, it is recognized that various other modifications and rearrangements of the structure will readily occur to those skilled in the art upon a full understanding of this invention and such modifications and rearrangements may be resorted to without departing from the scope of the invention as set forth in the claims.

What is claimed is:

1. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide follow-up rotation for said input shaft, and a condition selector valve interconnecting said metering valve and said steering actuator motor and said feedback motor, said selector valve being operable responsive to fluid pressure from said metering valve to direct fluid from said metering valve to said feedback motor and from said feedback motor to said actuator motor and from said steering actuator motor to said reservoir.

2. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide follow-up rotation for said input shaft, and a condition selector valve interconnecting said metering valve and said steering actuator motor and said feedback motor, said selector valve being operable responsive to fluid pressure from said metering valve to direct fluid from said metering valve to said feedback motor and from said feedback motor to said actuator motor and from said steering actuator motor to said reservoir, said condition selector valve being operable in the absence of fluid pressure from said metering valve to directly interconnect said feedback motor and said steering actuator motor to allow said feedback motor to operate as a pump to operate said actuator motor.

3. A hydraulic steering system as set forth in claim 2 wherein said feedback motor is operably connected to said input shaft by a lost motion connection allowing sufficient relative movement to operate said metering valve and allowing torque applied to said input shaft to positively operate said feedback motor as a pump in the absence of fluid pressure at said metering valve.

4. A hydraulic steering system comprising a steering actuator motor having first and second fluid chambers adapted to be selectively connected to a source of fluid pressure for reversible actuation, a rotatable input shaft, a source of fluid pressure, a reservoir, an open center metering valve operable by said input shaft and having an inlet port, first and second outlet ports and a discharge port, said valve being selectively operable to disconnect said inlet port from said discharge port and to one of said first and second outlet ports, a reversible positive displacement feedback motor operable to provide follow-up rotation for said input shaft, and a condition selector valve interconnecting said metering valve and said steering actuator motor and said feedback motor, said selector valve being operable responsive to fluid pressure from said metering valve to direct fluid from said metering valve to said feedback motor and from said feedback motor to said actuator motor and from said steering actuator motor to said reservoir, said condition selector valve being operable in the absence of fluid pressure at said metering valve inlet port to directly interconnect said feedback motor and said steering actuator motor to allow said feedback motor to operate as a pump to operate said actuator motor.

5. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said steering actuator motor and said feedback motor, said selector valve being operable responsive to fluid pressure from said metering valve to connect said feedback motor and said actuator motor in series between said metering valve and said reservoir, said condition selector valve being operable in the absence of fluid pressure from said metering valve to connect said feedback motor and said steering actuator motor in series in a closed circuit to allow said feedback motor to operate as a pump to operate said actuator motor.

6. A hydraulic steering system as set forth in claim 5 including means operable in the absence of fluid pressure from said metering valve to automatically replenish fluid lost from said closed circuit.

7. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, an axial piston feedback motor having a plurality of pistons operable to rotate a cam plate, a lost motion connection between said cam plate and said input shaft arranged to allow limited relative rotation between said cam plate and said input shaft to allow said input shaft to actuate said metering valve, and a condition selector valve interconnecting said metering valve and said steering actuator motor and said feedback motor, said selector valve being operable responsive to fluid pressure from said metering valve to direct fluid from said metering valve to said feedback motor and from said feedback motor to said actuator motor and from said steering actuator motor to said reservoir, said condition selector valve being operable in the absence of fluid pressure from said metering valve to directly interconnect said feedback motor and said steering actuator motor to allow said feedback motor to operate as a pump to operate said actuator motor.

8. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said steering actuator motor and said feedback motor, said selector valve being operable by fluid pressure from said metering valve to direct fluid from said metering valve to said feedback motor and from said feedback motor to said actuator motor and from said steering actuator motor to said reservoir, said condition selector valve being normally operable to lock said steering actuator motor to prevent fluid flow to and from said first and second fluid chambers.

9. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, and a condition selector valve interconnecting said metering valve and said steering actuator motor and said feedback motor, said selector valve being operable in one condition by fluid pressure from said metering valve to direct fluid from said metering valve to said feedback motor and from said feedback motor to said actuator motor and from said steering actuator motor to said reservoir, said condition selector valve being operable in another condition in the absence of fluid pressure from said metering valve to directly interconnect said feedback motor and said steering actuator motor to allow said feedback motor to operate as a pump to operate said actuator motor, said condition selector valve being normally operable to lock said steering actuator motor to prevent fluid flow to and from said first and second fluid chambers.

10. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provide a follow-up rotation for said input shaft, a lost motion connection operable to allow said input shaft to drive said feedback motor as a pump, and a condition selector valve interconnecting said metering valve and said steering actuator motor and said feedback motor, said selector valve being operable in one condition by fluid pressure from said metering valve to connect said feedback motor and said actuator motor in series between said metering valve and said reservoir to allow fluid from said metering valve to operate said feedback motor and said actuator motor to follow the rotation of said input shaft, said condition selector valve being operable in another condition by fluid pressure from said feedback motor to connect said feedback motor and said steering actuator motor in series in a closed circuit to allow said feedback motor to operate as a pump driven by said input shaft to operate said actuator motor.

11. A hydraulic steering system as set forth in claim 10 including check valve means interconnecting said feedback motor and said reservoir and operable in the absence of fluid pressure from said metering valve to automatically replenish fluid lost from said closed circuit.

12. A hydraulic steering system comprising a steering actuator motor having first and second fluid chambers adapted to be selectively connected to a source of fluid pressure for reversible actuation, a rotatable input shaft, a source of fluid pressure, a reservoir, a metering valve operable by said input shaft having first and second outlet ports and operable to selectively connect said fluid pressure source to said first and second outlet ports, a reversible positive displacement feedback motor operable to provie a follow-up rotation for said input shaft, a lost motion connection operable to allow said input shaft to drive said feedback motor as a pump, and a condition selector valve interconnecting said metering valve and said steering actuator motor and said feedback motor, said selector valve being operable in one condition by fluid pressure from said metering valve to connect said feedback motor and said actuator motor in series between said metering valve and said reservoir to allow fluid from said metering valve to operate said feedback motor and said actuator motor to follow the rotation of said input shaft, said condition selector valve being operable in another condition by fluid pressure from said feedback motor to connect said feedback motor and said steering actuator motor in series in a closed circuit to allow said feedback motor to operate as a pump driven by said input shaft to operate said actuator motor, said condition selector valve being operable in a third condition in the absence of fluid pressure to lock said steering actuator motor to prevent fluid flow to and from said first and second fluid chambers.

13. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve operable by said input shaft having first and second outlet ports and operable to selectively connect said fluid pressure source to said first and second outlet ports, an axial piston feedback motor having a plurality of pistons operable to rotate a cam plate, a lost motion connection between said cam plate and said input shaft, and passage and condition responsive control valve means connecting said metering valve and said steering actuator motor and said feedback motor in series to direct fluid flow from said metering valve first through said feedback motor and then through said actuator motor to said reservoir whereby said feedback motor provides a follow-up rotation to said input shaft proportional to the volume of fluid flowing from said feedback motor to said actuator motor.

14. A hydraulic steering system comprising a positive displacement steering actuator motor adapted to be selectively connected to a source of fluid pressure for reversible actuation, a rotatable input shaft, a source of fluid pressure, a reservoir, a metering valve having first and second outlet ports and operable to selectively connect said fluid pressure source to said first and second ports, a positive displacement feedback motor operable to rotate said input shaft in a follow-up motion, a lost motion connection operable to allow said input shaft to drive said feedback motor as a pump, and a condition selector valve interconnecting said metering valve and said actuator motor and said feedback motor with said reservoir, said selector valve comprising a housing having an axial bore therein, a plurality of valve spools in said bore, means normally biasing said valve spools toward a center position, fluid pressure means operable responsive to fluid flow from said metering valve to shift said plurality of valve spools together as a unit in one direction along said bore to thereby connect in series said metering valve to said feedback motor and said feedback motor to said actuator motor and said actuator motor to said reservoir to operate said actuator motor and to operate said feedback motor to follow the rotation of said input shaft, and means operable in the absence of fluid pressure from said metering valve responsive to fluid pressure from said feedback motor being operated as a pump to shift at least two of said plurality of valve spools away from each other away from said center position to directly connect said feedback motor to said actuator motor and to block off said metering valve and said reservoir whereby fluid flows from said feedback motor to said actuator motor to operate said actuator motor.

15. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve having first and second outlet ports and operable to selectively connect said fluid pressure source to said first and second ports, a positive displacement feedback motor operable to rotate said input shaft in a follow-up motion, a lost motion connection operable to allow said input shaft to drive said feedback motor as a pump, and a condition selector valve interconnecting said metering valve and said actuator motor and said feedback motor with said reservoir, said selector valve comprising a housing having an axial bore therein, a plurality of valve spools in said bore, means normally biasing all of said valve spools toward a center position to lock said steering actuator motor to prevent fluid flow to and from said actuator motor, fluid pressure means operable responsive to fluid flow from said metering valve to shift said plurality of valve spools together as a unit in one direction along said bore to thereby connect in series said metering valve to said feedback motor and said feedback motor to said actuator motor and said actuator motor to said reservoir to operate said actuator motor to drive said output member and to operate said feedback motor to follow the rotation of said input shaft, and means operable in the absence of fluid pressure from said metering valve responsive to fluid pressure from said feedback motor being operated as a pump to shift at least two of said plurality of valve spools away from each other away from said center position to directly connect said feedback motor to said actuator motor and to block off said metering valve and said reservoir whereby fluid flows from said feedback motor through said actuator motor to drive said output member and flows from actuator motor back to said feedback motor in a closed circuit.

16. A hydraulic steering system comprising a positive displacement steering actuator motor adapted to be selectively connected to a source of fluid pressure for reversible actuation, an output member driven by said actuator motor, a rotatable input shaft, a source of fluid pressure, a reservoir, a metering valve having first and second relatively movable members, one of said members being movable by said input shaft, said metering valve having first and seuond outlet ports and operable to selectively connect said fluid pressure source to said first and second ports responsive to the relative movement of said first and second members, an axial piston feedback motor having a plurality of pistons operable to rotate a cam plate, said cam plate being operable to move the other of said metering valve members in a follow-up motion, a lost motion connection between said cam plate and said input shaft to allow said input shaft to drive said feedback motor as a pump, and a condition selector valve interconnecting said metering valve and said steering actuator motor and said feedback motor with said reservoir, said selector valve comprising a housing having an axial bore therein, a plurality of valve spools in said bore, means normally biasing all of said valve spools toward a center position to lock said steering actuator motor to prevent fluid flow to and from said actuator motor, fluid pressure means operable responsive to fluid flow from said metering valve to shift all of said valve spools together as a unit in one direction along said bore to thereby connect said metering valve to said feedback motor and said feedback motor to said actuator motor and said actuator motor to said reservoir to operate said actuator motor to drive said output member and to operate said feedback motor to follow the rotation of said input shaft, and means operable in the absence of fluid pressure from said metering valve responsive to fluid pressure from said feedback motor being operated as a pump to shift at least two of said plurality of valve spools away from each other away from said center position to directly connect said feedback motor to said actuator motor and to block off said metering valve and said reservoir whereby fluid flows from said feedback motor through said actuator motor to drive said output member and flows from said actuator motor back to said feedback motor in a closed circuit.

17. A hydraulic system comprising an actuator motor adapted to be selectively connected to a source of fluid pressure for reversible actuation, a rotatable input shaft, a source of fluid pressure, a reservoir, an open center metering valve having a valve member movable by said input shaft and having a neutral position, a positive displacement feedback motor arranged to rotate said input shaft in a follow-up motion, means interconnecting said metering valve and said feedback motor with said actuator motor whereby said feedback motor is operable to provide a feedback movement proportional to the output of said actuator motor, said metering valve having a pressure port connected to said fluid pressure source, said metering valve having a drain port connected to said reservoir, said metering valve having a downstream port, said metering valve having first and second control ports adapted to selectively supply fluid from said pressure source to said feedback motor and said actuator motor when said valve member is shifted away from said neutral position, said metering valve being arranged to supply fluid from said pressure port to said downstream port only when said valve member is in the neutral position.

18. A hydraulic steering system comprising a positive displacement steering actuator motor adapted to be selectively connected to a source of fluid pressure for reversible actuation, a rotatable input shaft, a source of fluid pressure, a reservoir, a metering valve having first and second relatively movable members having a neutral position, one of said members being movable by said input shaft, a positive displacement feedback motor arranged to rotate the other of said movable members, means interconnecting said metering valve and said feedback motor with said actuator motor whereby said feedback motor is operable under power steering conditions to provide a feedback movement for said movable valve member proportional to the output of said actuator motor, said metering valve having a pressure port connected to said fluid pressure source, said metering valve having a drain port connected to said reservoir, said metering valve having a downstream port, said metering valve having first and second control ports adapted to selectively supply fluid from said pressure source to said feedback motor and said actuator motor when said first and second movable valve members are shifted away from said neutral position with respect to each other, said metering valve being arranged to supply fluid from said pressure port to said downstream port only when said movable valve members are in the neutral position.

References Cited

UNITED STATES PATENTS

| | | | |
|---|---|---|---|
| 2,020,951 | 11/1935 | Lemon | 60—52 |
| 2,918,135 | 12/1959 | Wittren | 60—52 |
| 3,246,472 | 4/1966 | Kries | 60—52 |

EDGAR W. GEOGHEGAN, *Primary Examiner.*